Figure 1:
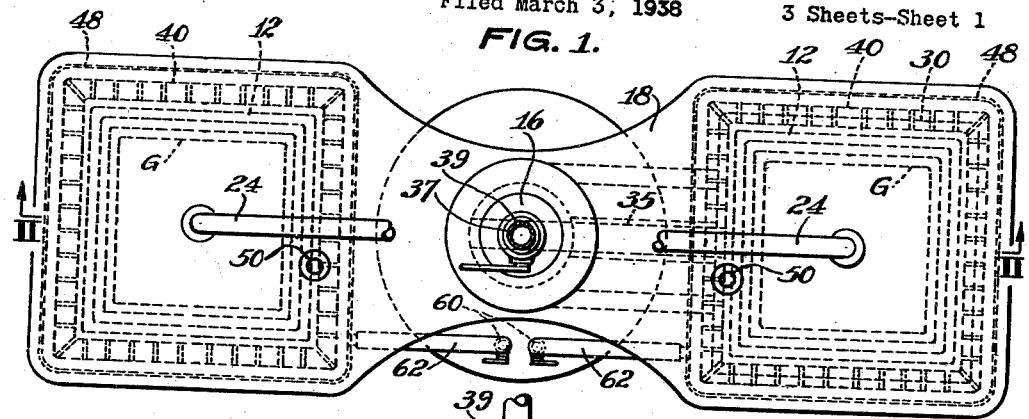

April 15, 1941.   H. H. BLAU   2,238,153
METHOD FOR MAKING HOLLOW GLASS BUILDING BLOCKS
Filed March 3, 1938   3 Sheets-Sheet 1

WITNESSES
AB Wallace
AH Oldham

INVENTOR.
Henry H. Blau
BY Brown, Critchlow & Hick
his ATTORNEYS.

Patented Apr. 15, 1941

2,238,153

UNITED STATES PATENT OFFICE 2,238,153

METHOD FOR MAKING HOLLOW GLASS BUILDING BLOCKS

Henry H. Blau, Charleroi, Pa., assignor to Corning Glass Works, Corning, N. Y., a corporation of New York Application March 3, 1938, Serial No. 193,703

4 Claims. (Cl. 49—82)

This invention relates to improved methods for commercially producing sealed hollow glass articles, as, for example, building blocks, double window panes and the like.

This application is a continuation in part of my application No. 168,636, filed October 12, 1937, which has matured into Patent No. 2,191,953, dated February 27, 1940.

Heretofore, hollow glass articles, and particularly blocks, have usually been made by forming complemental parts, as, for example, halves, with circumferential flanges whose engaging portions were heated to fusing temperature and pressed together to form a hollow block. Again the complemental parts have been cemented or soldered together. These methods I have found to be open to various objections including either too high or too low a pressure within the block, condensation of moisture within the block, deterioration of the glass surfaces within the block due to corrosion thereof by the gas or gases trapped within the block when it is sealed, high scrap loss due to blowouts in the zone of joinder of the glass parts by the expansion of the gases trapped in the blocks during sealing, and lack of adequate methods and apparatus for rapidly producing products uniformly high grade in character.

It is the general object of my invention to overcome the foregoing and other difficulties of known types of structural hollow glass articles, particularly building blocks, by the provision of improved methods for making articles having their interior filled with gas of high heat capacity and under a desired pressure, which gas is of a non-corrosive nature and does not condense at temperatures to which the articles are subjected in service.

Another object of my invention is the provision of improved methods for commercially manufacturing structural units of hollow glass, which methods provide for the introduction of gas of the desired character and amounts within the unit in a rapid and efficient manner particularly adapted for production operations.

The foregoing and other objects of my invention are achieved by the provision of methods for producing a structural building unit of hollow glass having its interior filled with a non-aqueous gas having a molal heat capacity of not less than about eight, which gas will not condense within the block at a temperature above about —15° F., and which gas is under a desired absolute pressure. This gas is introduced into the hollow glass unit during its manufacture. Ordinarily, the complemental glass parts to be joined together to form a hollow unit are first formed, as by pressing. Certain portions of the parts are then heated to soften them, and they are then fused together to form a hollow unit. After heating the portions to be engaged with each other, and before pressing them into fused relation, the desired quantity of gas is introduced between the parts. I may accomplish this by using automatic joining apparatus and placing the entire apparatus in a hood or other suitable enclosure which is filled with the gas, and then feeding the glass parts to the hood and removing the finished articles from it by automatic mechanism and through suitable traps.

Instead of shielding the entire apparatus by a hood, the gas may be supplied between the parts prior to joining them together by placing a shield around the individual parts and then flowing gas through the shield in such quantity and amount that when the parts are fused together a desired amount of the gas is trapped in the articles. The peferred manner of supplying gas to the interior of the hollow units is to introduce it in solid or liquid form between the parts after heating and prior to fusing them together. A desired amount of the gas in solid or liquid form may be placed in the lowermost of the complemental parts, the heat of which rapidly volatilizes the material, which, in gaseous form, then displaces a substantial amount of the gases within the parts and often sweeps out all other gases and moisture. By controlling the amount of time between the deposition of solid or liquid material in the lowermost part, and the time of final fusing of the parts together, I am able to control the pressure of the gas within the finished unit; and by bringing the complemental parts into closely spaced relation prior to final fusing of the parts together, gases and vapors, other than the particular gas desired, are largely driven from between the parts.

Apparatus for practicing my improved methods, and for producing structural units of the character described, ordinarily includes means for suporting complemental glass parts to be joined together, means for heating the portions of the parts to be engaged, means for providing gas of the desired character between the parts, and means for pressing the heated portions of the parts together to form a hollow structural unit of glass, the last-named means functioning with a predetermined dwell when the parts are in closely spaced relation, whereby a desired amount of the gas is sealed within the unit. The apparatus preferably includes means for feeding a desired amount of gas in liquid or solid form to the lowermost of the complemental glass parts and likewise preferably includes a heat-insulating shield for surrounding the parts to be joined and for supplying gas of the desired character to the interior of the shield.

Figure 2:
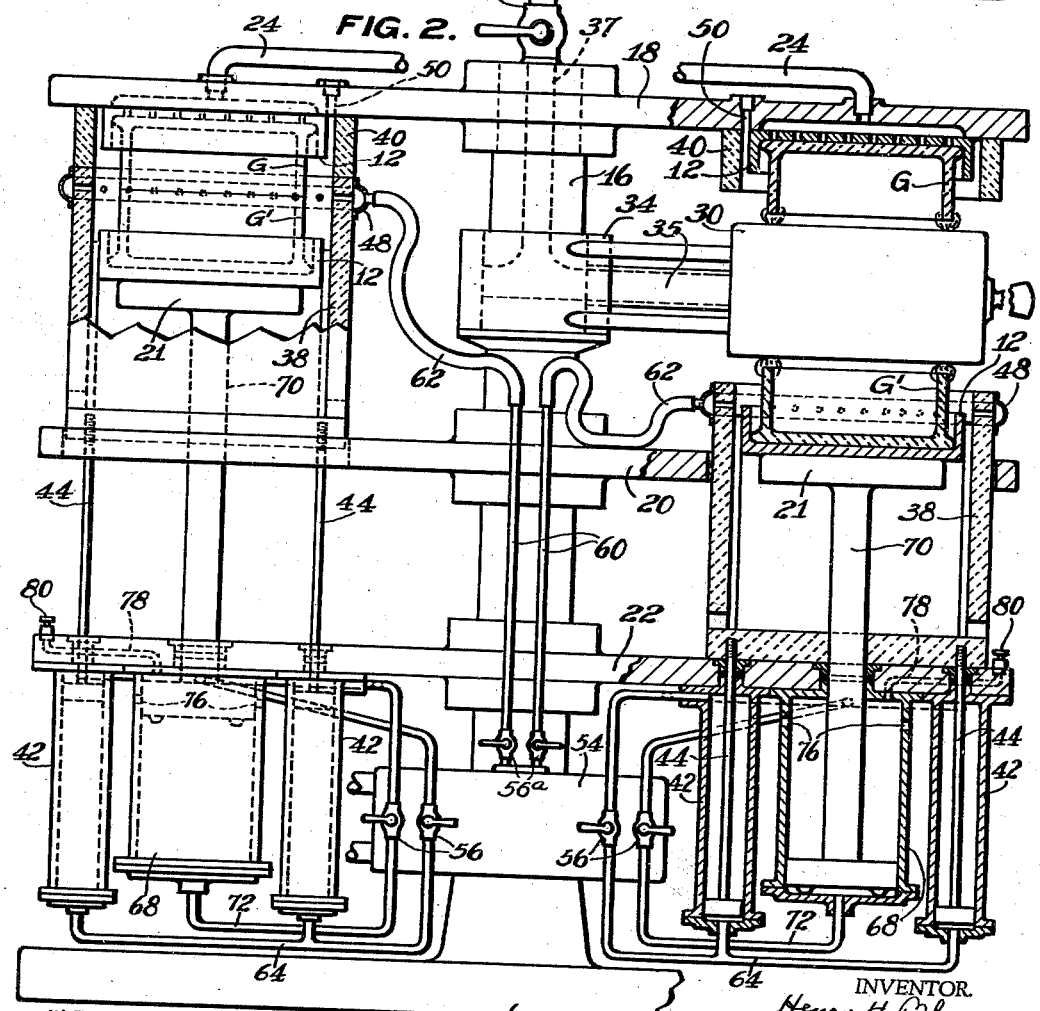
Figure 3:
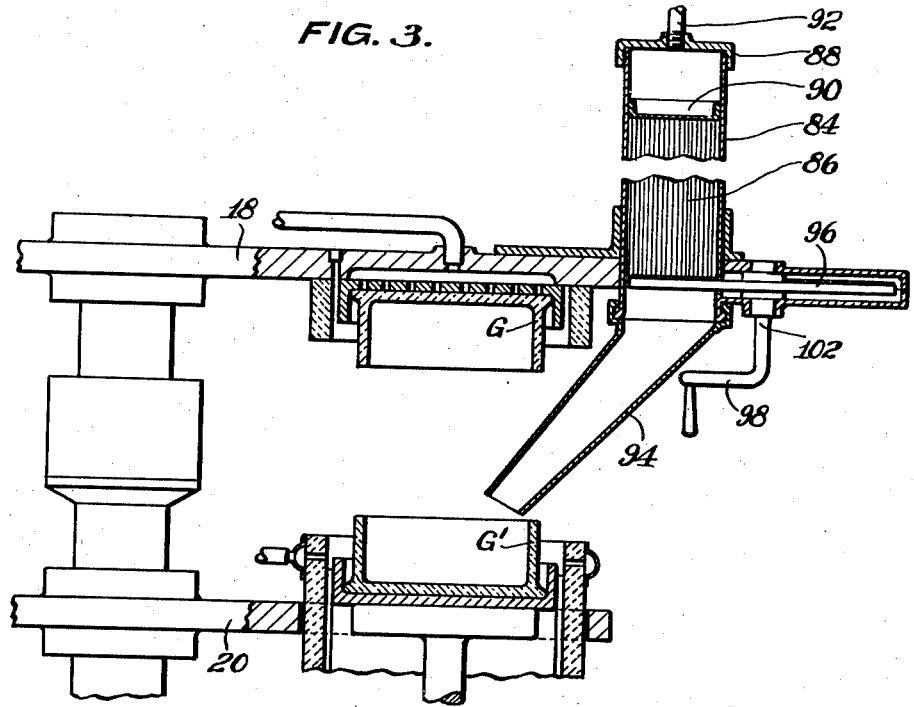
Figure 4:
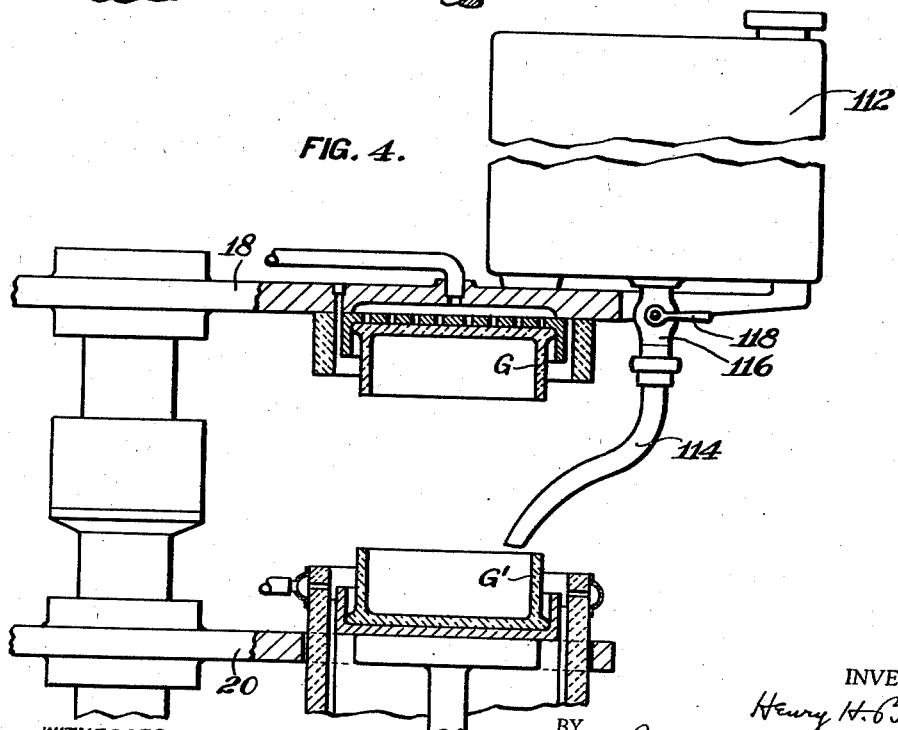

For a better understanding of my invention, reference should be had to the accompanying drawings, wherein Fig. 1 is a diagrammatic plan view of one embodiment of apparatus for practicing my invention; Fig. 2 a vertical sectional view taken on the line II—II of Fig. 1 and showing the details of the apparatus; Fig. 3 a vertical sectional view of the solid gas-feeding mechanism; Fig. 4 a view similar to Fig. 3 illustrating apparatus for suplying gas in liquid form to the complemental parts to be joined together; and Fig. 5 a graph illustrative of properties of gases suitable for the practice of my invention.

As above indicated, my invention is capable of producing sealed hollow articles of glass and articles including glass walls regardless of the particular size, weight, shape and use of the articles. However, my invention is particularly beneficial in the production of sealed hollow building blocks of glass and hence is illustrated in conjunction therewith and will be so described.

My improved method can be practiced in conjunction with apparatus of various types as, for example, simple hand equipment or automatic turret-type mechanism. I have conveniently illustrated my new method of making sealed hollow articles of glass in conjunction with a comparatively simple apparatus which in and of itself comprises a part of my invention. This apparatus is particularly illustrated in the drawings wherein the numeral 14 indicates generally a base having a post 16 secured thereto in fixed relation which centrally supports tables 18, 20 and 22. A plurality of pairs of work-receiving chucks 12 are mounted on the under side of table 18 and the upper side of table 20 as illustrated particularly in Fig. 2 which are adapted to releasably receive glass parts G and G' to be joined together to form a sealed hollow block. The chucks 12 can be of any desired type as, for example, mechanical, but are conveniently made of the suction type having control conduits 24. The chucks 12 on the table 20 merely have to support the glass part G in proper alignment since the part is held in position by gravity and hence need not positively grip the glass part G.

The several pairs of chucks 12 are conveniently two in number as shown and are spaced equally from the post 16 so that a burner 30 rotatably supported on the post as by a collar 34 can be swung to and from working relation with any one of the pairs of work-receiving chucks 12. The burner 30 may be of any desired type, electrical or otherwise, but is conveniently in the form of a gas burner adapted to burn a mixture of gas and air or oxygen and having ports which can be positioned in alignment with the flanges of the glass parts G and G' to heat them to fusing temperature as illustrated on the right-hand side of Fig. 2. The burner 30 is connected by conduit 35 to the collar 34 and in turn to a supply conduit 37 having a control valve 39. The post 16 is suitably apertured so as to permit the swinging movement of the conduit 37 in the movement of the burner 30 between the two pars of work-receiving chucks 12.

A heat-insulating or conserving shield is positioned around each set of the glass parts during the joining operation whereby the parts can be maintained at a desired joining temperature. While such heat-shielding means may take a plurality of forms, a suitable type of shield is indicated in Fig. 2 of the drawings as including a length 38 of heat-insulating material of any desired cross-section, as, for example, square, which is slidably mounted in a suitable aperture in table 20 and which has a relatively short complemental portion 40 secured to the under side of the table 18. Normally each shield 38 is in the retracted or lower position shown on the right-hand side in Fig. 2 during the heating of the glass parts G and G' by the burner 30 but the shield is adapted to be raised as shown on the left-hand side of Fig. 2 immediately after the glass parts have been heated and the burner is moved out of the way. The raising of the shield 38 to surround the glass parts may be achieved by fluid pressure motors 42 mounted on the underside of the lower table 22 and including piston rods 44 which slidably extend through the table 22 and into engagement with the bottom of shield 38.

Although the heat-insulating shield has been described as having the function of holding the glass parts at a desired temperature and against loss of heat until joined together, it has the additional purpose of providing a closed space around the glass parts immediately after heating so that gas of the desired character can be passed through the shield to fill it and the space between the glass parts with a gas of desired characteristics. Thus when the glass parts are sealed this gas is trapped in desired amounts within the hollow body produced. To this end I provide at the upper edge of the heat shield 38 a conduit 48 having lateral ports which are directed inside of the shield. Vent openings 50 are provided in the table 18 to permit the controlled venting of gas trapped within the shield. The gas supplied to the interior of the heat shield during the joining of the glass parts together may be of the type hereinafter specifically disclosed. However, I likewise contemplate broadly preheating the gas substantially to the temperature of the glass parts prior to its introduction into the shield so that expansion of the gases after sealing is largely nullified and I may likewise remove all water vapor from the gas. For example, the gas may be passed through a dehydrating agent such as calcium chloride to remove water vapor from it, and on its passage to conduits 48 the dehydrated gas may be carried through a suitable heater to preheat it. Many of the advantages of my invention are retained by practicing the steps of preheating and/or removing moisture from the gas even though other gases than those specifically recited are employed. For example, I may use only water-free air as the gas.

To provide for the supply of gas to the conduit 48 I provide a flexible conduit 62 which is connected by way of conduit 60 to a control panel 54 mounted upon the base 14 and having a suitably marked valve 56ª for controlling the supply of gas to the conduits 60, 62 and 48. The control panel 54 likewise carries other suitably identified valves 56 controlling the flow of fluid under pressure to conduit 64 connected to the fluid pressure motors 42 for raising and lowering the shield 38.

While it has been stated above that the lower chucks 12 of each pair of work-supporting chucks is positioned upon the table 20, actually each lower chuck is carried upon a movable part 21 of this table which is entirely surrounded by the heat-insulating shield 38. The part 21 is adapted to be given controlled vertical movement to bring the lower glass part G' from the heating position shown in the right-hand side of Fig. 2 to the joining positions shown at the left-hand side of this figure. The portion 21 of the table and the lowermost chuck 12 may be moved vertically by a fluid pressure motor 68 mounted upon the under side of the table 22 and including a piston rod 70 secured to the under side of the portion 21. Conduits 72 connected to the fluid pressure motor 68 extend to the control panel 54 which includes identified valves 56 for supplying the flow of fluid under pressure to the motor 68.

In the practice of my method I bring the complemental glass parts after heating to a position in closely spaced relation to each other and in such position cause a dwell of a predetermined time before pressing the parts together as disclosed particularly in my copending application Serial No. 162,902, filed September 8, 1937. However, in the embodiment of my invention illustrated substantially the same result is obtained by a single fluid pressure motor 68 and the use of vent openings. Specifically the sides of the cylinder of the fluid pressure motor 68 are vented as at 76 and a vent opening 78, adjustably closed by a screw 80, is provided in the table 22.

By this arrangement of parts the fluid pressure motor 68 when energized through the conduit 72 raises its piston and the lower chuck 12 to bring the glass part G' into spaced relation with the glass part G. Air escapes from the cylinder of the motor through the vents 76 to allow the movement of the piston rod 70 as just described. Once the piston of the air motor covers the vent openings 76 in its upward movement the air trapped between the piston and the uppermost end of the air motor cylinder retards further upward movement of the lowermost glass part G'. However, the trapped air can escape through the vent opening 78 in amounts determined by the adjustment of the screw 80 so that after a predetermined dwell the glass parts are pressed together in fused relation as shown at the left-hand side of Fig. 2. Actually the glass part G' is moved relatively rapidly into a closely spaced position with respect to the glass part G and is then moved relatively slowly into final fused relation with the glass part G.

It is believed that the operation of the apparatus just described will be evident from the foregoing description. However, briefly reviewing the operation, a pair of complemental glass parts are positioned in the chucks 12 at the right-hand side of Fig. 2. The burner 30 is now swung into position between the glass parts and the flanges of the parts are brought to a soft plastic fusing temperature. The burner 30 is then swung out of the way and the shield 38 is raised to surround the glass parts. Gas is supplied to the interior of the shield 38 by way of conduits 60, 62 and 48 in predetermined quantities and of desired characteristics. The air or other gas trapped within the shield is vented out through the openings 50 so that the shield can be filled with the desired gas. Fluid pressure motor 68 is now energized to bring the lowermost glass part G' up into closely spaced relation with the glass part G and after a predetermined dwell as controlled by the screw 80 the glass parts are pressed together in fused relationship to form a sealed hollow body.

It will be understood that when one pair of glass parts is being heated at one side of the apparatus in Fig. 2, another pair of glass parts which have been heated are being sealed together at the other side of the apparatus of Fig. 2. As soon as a pair of glass parts are sealed together the heat shield 38 and the lower chuck 12 are dropped down out of the way and the sealed hollow block is removed from the upper chuck 12 by release of the suction on the conduit 24. Another pair of glass parts is then immediately inserted into the chucks 12 and the burner 30 is swung into heating position between them. It will thus be evident that the operation can proceed continuously to rapidly and efficiently produce sealed hollow articles of glass of desired character.

During the joining operation when the fluid pressure motor 68 is energized to raise the lower glass part G' into closely spaced relation with the glass part G, the parts are held for a predetermined length of time without joining them together so that a desired amount of gas can be trapped between the parts when pressed together after the dwell. If the parts are pressed together immediately the gas trapped between them may be under a greater pressure than desired in the finished block. If, on the other hand, the dwell is prolonged to allow the gas between the hot closely spaced blocks to completely expand and rarefy, the gas pressure within the finished block may be lower than is desirable. Thus by controlling the length of the dwell I am able to provide a structural building unit of hollow glass having a desired internal pressure best suited for uses to which the article may be put and having other advantages as, for example, the ability to eliminate blowouts following the sealing of the article. Specifically, I have found that by making the pressure within the block when in service substantially atmospheric the wall thickness and area of the block faces can be made substantially as desired without danger of block failure due to comparatively large negative or positive pressures in the inside of the block.

It will be understood that in the use of my apparatus as just described the apparatus may be and preferably is positioned closely adjacent apparatus for forming the complemental glass parts to be joined together. Thus the glass parts while still hot from their forming operation can be quickly transferred to the joining apparatus by automatic transfer mechanism or by an operator with the aid of tongs or a paddle. Also associated with the joining apparatus there is a lehr for receiving the hollow units made by the apparatus and I contemplate the provision of automatic transfer mechanism, which per se is shown in many granted patents, for moving the units to the lehr from the unloading station or workmen may transfer the units with tongs or paddles.

My invention has been described in conjunction with an insulating hood or shield for surrounding the glass parts which shield receives gas of the desired character to be trapped between the glass parts. I have discovered that a particularly advantageous way of achieving the desired result is to introduce the gas in liquid or solid form to the interior of the glass parts prior to joining and I provide apparatus for so doing. This apparatus may be used with the heat-conserving shield and its associated gas-supplying mechanism or it can be used without the shield in the apparatus as just described.

Preferably, however, I introduce the gas when in liquid or solid form within the glass parts while employing the heat shield but eliminate the mechanism for supplying gas through the shield.

In Fig. 3 I have illustrated mechanism for supplying a given amount of gas in solid form to the inside of the complemental glass parts to be joined together. I have found that the shape and size of the block of solid gas introduced are quite important. Preferably the solid gas is introduced in the form of a snow or powder so that the extent of the exposed surface permits the volatilization of the gas to take place rapidly. The mechanism I have illustrated in Fig. 3 is adapted to provide the solid gas in the form of a powder and includes a stationary cylinder (preferably insulated) containing a mass 86 of the solidified gas which can be introduced into the cylinder by removing a cap 88 secured to its top. A piston 90 is positioned in the cylinder 84 over the upper end of the mass 86 so that air under pressure supplied through the cap 88 by a conduit 92 effects a steady downward force upon the block. The cylinder 84 is provided with a laterally movable chute 94 which can be moved to and from a position between the tables 18 and 20 to bring its lower end over the lower glass part G' and so that when moved out of the way the heat-insulating shield and the glass parts can be raised as heretofore described.

Suitable means are provided for removing a portion of the solidified gas from the cylinder and dropping it down through the chute 94 into each glass part G'. These means have been illustrated as including a rotary disc cutter 96 which engages with the lower end of the mass 86 and which upon rotation of the disc shears a predetermined amount of the mass into the chute 94. A handle 98 is secured to the shaft 102 carrying the disc 96 so that a predetermined number of turns of the handle supplies the desired amount of solidified gas.

An apparatus of the type shown in Fig. 3 is supported at each end of the table 18 adjacent each pair of work-receiving chucks. It should be distinctly understood, however, that instead of the apparatus just described I may employ other mechanisms for introducing solidified gas into the interior of the lower glass part G' or I may simply drop by hand a measured amount of the solidified gas into the glass parts.

The apparatus of Fig. 4 is generally similar to that shown in Fig. 3 but illustrates mechanism for feeding gas in liquid form to the interior of the glass parts prior to joining. In the mechanism of Fig. 4 the numeral 112 indicates a tank containing the liquid gas, which tank is provided with a feed conduit 114 adapted to be swung into position over the lower glass part G'. A valve 116 in the conduit controls the flow of liquid gas therethrough and this valve may be operated by the handle 118 to control the amount of liquefied gas fed to the lowermost glass part G'. A tank 112 may be mounted adjacent each end of the table 18 so that liquid gas can be fed as desired to the lowermost glass parts G' or I may adopt other mechanism for supplying the liquid gas to the glass parts as will be understood.

The use of liquid and solid gas as just described has certain specific advantages and forms a particularly important part of my inventive concept in that the rapid volatilization of the liquid and solid gas sweeps all air, moisture or other gases out from between the blocks just before the glass parts are joined together. This action alone tends to prevent both weathering of the glass surface and fogging by condensation when the block is used.

Figure 5:
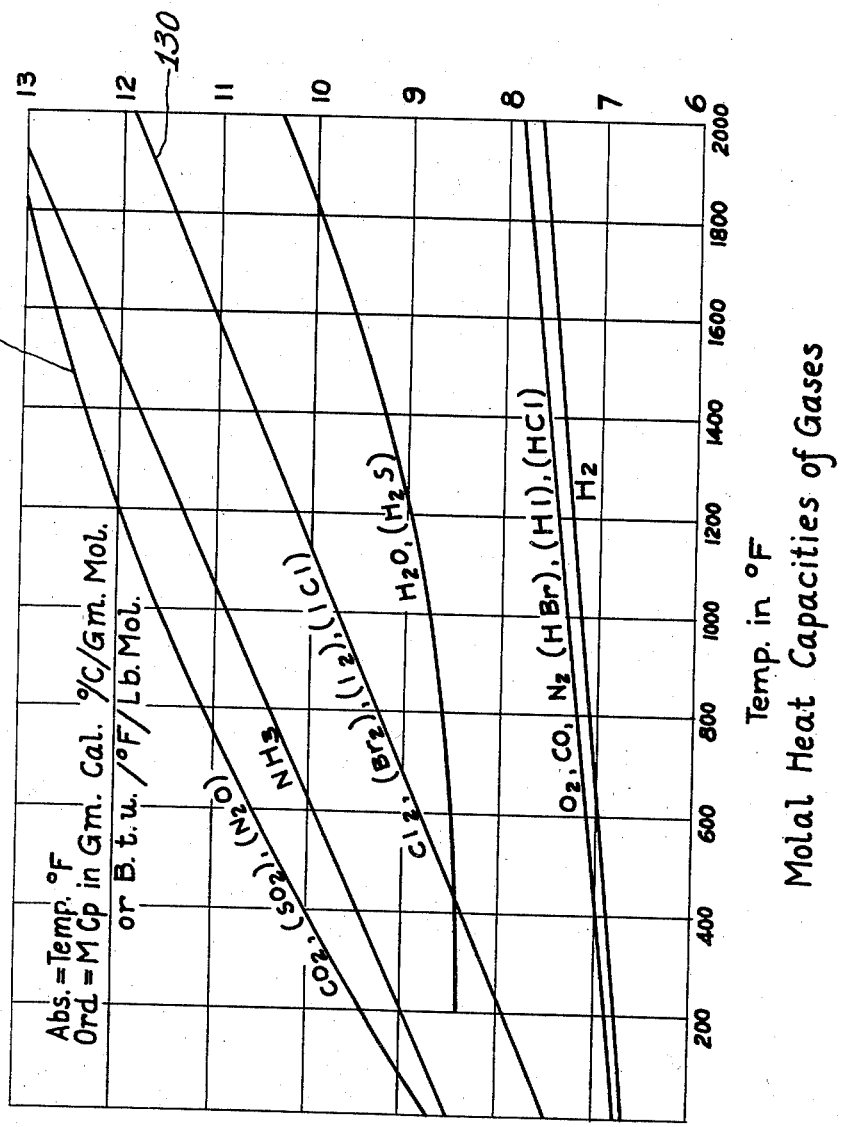

In the practice of my invention, I preferably employ non-aqueous gases having high heat capacities. In Fig. 5 I have graphically illustrated the molal heat capacities of certain gases. In Fig. 5 the abscissas are calibrated in degrees Fahrenheit, and the ordinants in B. t. u. per degree F. per lb. mol. In accordance with known data $O_2$, CO, $N_2$, HBr, HI, HCl and $H_2$ have been graphically illustrated as having a molal heat capacity of somewhat less than 7 at 0° F. and a slowly increasing heat capacity as the temperature increases until at 2000° F. their molal heat capacity is somewhat over 7½. Water, or more particularly steam and $H_2S$, have been graphically represented in accordance with known data as having a molal heat capacity of approximately 8½ at 212° F. and gradually increasing to a heat capacity of approximately 10⅓ at 2000° F.

As directly distinguished from the heat capacity, and its variation under rising temperature, of air and steam, is that of certain other gases which are graphically indicated by the lines marked 130 and 131. Even at 0° F. these gases identified along line 130 have a molal heat capacity of 7½, which capacity rather quickly rises to about 12 at a temperature of approximately 2000° F. The gases identified along line 131 have a molal heat capacity at 0° F. of about 8⅔ which capacity rises to well over 13 at 2000° F. The gases identified along lines 131 and others of like nature are best suited for my purpose. Particularly gases which are beneficial from a heat capacity standpoint when employed to completely fill a hollow building unit of glass include carbon dioxide, sulfur dioxide, ammonia, formaldehyde, disilane, boron trifluoride, dichlorethylene and others of the same character. Any gas having a molal heat capacity of not less than 8, and not objectionable because of poisonous nature or corrosive effect, is satisfactory when employed in hollow glass structural articles. I have found that many of the gases having a molal heat capacity of over 8 fall under the heading of polyatomic gas by which is meant a gas whose molecules are conveniently considered as consisting of more than two atoms.

Gases of the indicated type have the characteristic of high specific heat which makes them particularly suitable in sealing glass parts together without such changes of volume of the gas during sealing or during the annealing of finished blocks as to cause them to blow out or bulge outwardly. Gases of high molal heat capacity and of the character indicated do not condense under atmospheric pressure at temperatures above about —15° F., which is about the lowest temperature to which blocks containing them are subjected in service, and as gases they have little or no corrosive or other objectionable action upon the interior surfaces of the glass units. Aging, whitening, crumbling and other corrosive action upon the internal surfaces are thus avoided by the use of these gases.

I preferably employ gases of high molal heat capacity which are most easily handled, inexpensive, and free from corrosive or poisonous effect. Carbon dioxide is preferably used. It is particularly advantageous because of its properties and because it readily can be handled in solid form for practicing the method in conjunction with the apparatus illustrated in Fig. 3. By way of example, in manufacturing a hollow glass building block having an external size of 8x8x4 inches I insert between about 4 and about 12 and usually about 8 grams of solid carbon dioxide into the parts prior to joining, and join them at an effective mean temperature of between about 1000 and about 1300 and usually about 1130° F., while permitting a dwell of between about 1 and about 5 and usually approximately 3 seconds to obtain a finished block having an internal absolute pressure of substantially 13.5 pounds at 70° F. Certain other of the gases having a high molal heat capacity particularly adapt themselves to handling in the liquid state, as by the apparatus illustrated in Fig. 4, or the gases can be used in their gaseous state by utilizing the conduit 48 of the heat-insulating shield 38.

The gases which I preferably employ in the sealed hollow articles herein described have been discussed on the basis of molal heat capacity. It should also be noted that the thermal conductivity of these gases is relatively low which is likewise important for the reason that the lower the thermal conductivity of the gases the better are their heat-insulating characteristics. At 0° C. the following gases have the indicated thermal conductivity:

| | |
|---|---|
| Air | 2.23 |
| Carbon dioxide | 1.37 |
| Ammonia | 2. |
| Sulfur dioxide | .768 |
| Carbon monoxide | 2.15 |
| Water | 2.17 |

While I have throughout the specification referred to the introduction of a gas, it will be recognized that many of the advantages of my invention are achieved by introducing a mixture of gases of the herein-described character. I may likewise introduce solid or liquid materials into the glass parts prior to joining, which materials decompose under the action of heat to form gases, or mixtures of them, of the desired character. Examples of such materials include ammonium-carbamate, nitrosyl chloride and alkyl amines. As illustrative of these, ammonium-carbamate decomposes under the action of heat to form two molecules of ammonia and two of carbon dioxide, which decomposition is accompanied by considerable expansion and the formation of a mixture of gases of high heat capacity. The decomposition of the material and expansion of the gases sweeps out the undesirable gases and water vapor from the interior of the glass parts, as will be understood.

The sweeping out of all undesirable gases and water vapor from the interior of the glass parts just prior to joining by the use of rapidly volatilizing solid or liquid gas deposited in the glass parts is an important part of my inventive concept, and it should be expressly understood that this part of my invention can be employed in conjunction with gases other than those of high molal heat capacities, as, for example, liquid oxygen, nitrogen or air. This is because the sweeping out of all moisture, products of combustion, and other gases and filling the glass parts with nitrogen will alone provide a finished glass block not subject to weathering or condensation on its interior surface.

From the foregoing it will be recognized that the objects of my invention have been achieved by the provision of an improved building block, hollow window pane or other sealed hollow glass article filled with a gas having certain specific characteristics. The methods and apparatus for producing my improved articles are particularly adapted to commercial production and provide uniformly high grade articles with a minimum of equipment and labor costs and with little breakage or defective loss.

Throughout this specification, and in the claims, hollow glass articles are described and defined as being filled with certain gases. As so used, the term "filled" means that the unit contains a sufficient amount of the gas to effect the result explained in the specification, regardless of the presence of another gas or other gases, and regardless of the pressure of the gas or the partial pressures of a mixture of gases. As a lower limit, more than 10 per cent of the contents of the article should be the certain gases and ordinarily the percentage is much higher and often approaches 100 per cent.

It will be appreciated that the terms "liquid" or "solid" gas as employed in the specification and claims refer to materials which are normally gaseous at temperatures above about $-15°$ F. and at atmospheric pressure but which are used in the practice of my invention in liquid or solid form. The use of normally gaseous materials in liquid or solid form is well understood by the man skilled in the art and is exemplified by solid $CO_2$ or "dry ice."

While I have illustrated several embodiments of my invention specifically and have particularly described the methods and the articles produced, it should be understood that my invention is not limited to or by these particular exemplary disclosures, but is defined in the appended claims.

I claim:

1. The method of making hollow glass building blocks from a pair of flanged halves thereof, comprising positioning the halves with the edges of their flanges opposed to but spaced from each other, supplying to the interior of at least one of the halves a material in condensate form but which under atmospheric pressure and at and above a temperature of $-15°$ F. is a gas having a molal heat capacity of at least 8, maintaining said halves at a temperature sufficiently high to gasify said condensate, and then sealing the flanges of the halves together to form a hollow block having some of the gasified material therein.

2. The method of making hollow glass building blocks from a pair of flanged halves thereof, comprising positioning the halves with the edges of their flanges opposed to but spaced from each other, supplying to the interior of at least one of the halves a material in solid form but which under atmospheric pressure and at and above a temperature of $-15°$ F. is a gas having a molal heat capacity of at least 8, maintaining said halves at a temperature sufficiently high to gasify said solid, and then sealing the flanges of the halves together to form a hollow block having some of the gasified material therein.

3. The method of making hollow glass building blocks from preformed complemental parts which comprises treating the portions of the parts to be engaged to adapt them to be sealed together, completely surrounding the parts with closure means, filling the interior of the closure means with a gas having molal heat capacity of at least 8 at $-15°$ F. and at atmospheric pressure, sealing the glass parts together within the closure means to form a hollow block having its interior filled with said gas, opening the closure means, and removing the hollow block.

4. The method of manufacturing sealed hollow building blocks of glass from preformed complemental parts which comprises holding the parts of the article in spaced-apart relation, heating the portions of the parts to be engaged to soften them, positioning heat-insulating means completely around the parts to retain the heat in the flanges, supplying fluid to the interior of the heat-insulating means, thereafter pressing the softened portions of the parts together in fused relation to form a sealed hollow block with at least certain of the fluid trapped therein and while still surrounded by the heat-insulating means, and removing the heat-insulating means.

HENRY H. BLAU.